United States Patent [19]

Klier et al.

[11] Patent Number: 4,594,847

[45] Date of Patent: Jun. 17, 1986

[54] DETACHABLY INTERCONNECTABLE CHAIN LINK AND CHAIN CONSTRUCTED THEREWITH

[75] Inventors: Kurt Klier; Heinz Klier, both of Kaufbeuren-Neugablonz, Fed. Rep. of Germany

[73] Assignee: E.H. Ashley & Company, Inc., Providence, R.I.

[21] Appl. No.: 642,372

[22] Filed: Aug. 20, 1984

[51] Int. Cl.$^4$ .............................................. F16G 13/06
[52] U.S. Cl. ........................................ 59/85; 59/80; 63/4
[58] Field of Search .................. 59/80, 82, 84, 85, 88, 59/90, 900; 63/3, 4, 9, 11, DIG. 3; 24/230.5 R, 232 R, 242

[56] References Cited

U.S. PATENT DOCUMENTS

| 1,279,066 | 9/1918 | Woods | 59/88 |
| 3,590,443 | 7/1971 | Kubsch | 59/88 |

FOREIGN PATENT DOCUMENTS

| 1186977 | 9/1959 | France | 59/900 |
| 833700 | 4/1960 | United Kingdom | 63/DIG. 3 |
| 848083 | 9/1960 | United Kingdom | 63/4 |

Primary Examiner—Francis S. Husar
Assistant Examiner—David B. Jones
Attorney, Agent, or Firm—Salter & Michaelson

[57] ABSTRACT

A detachably interconnectable chain link and a chain comprising a plurality of the links in interconnected relation. The links are preferably of substantially figure 8-shaped configuration and comprise slightly resilient first and second substantially S-shaped link elements secured to each other in crossing relation so that they cooperate to define first and second substantially closed loops at the opposite extremities of the link with the adjacent terminal ends of the link elements in closely adjacent, but disconnected laterally offset relation. The links are interconnectable to form the chain by forcing the terminal ends of one link into interlocking engagement with the terminal ends of an adjacent link.

5 Claims, 5 Drawing Figures

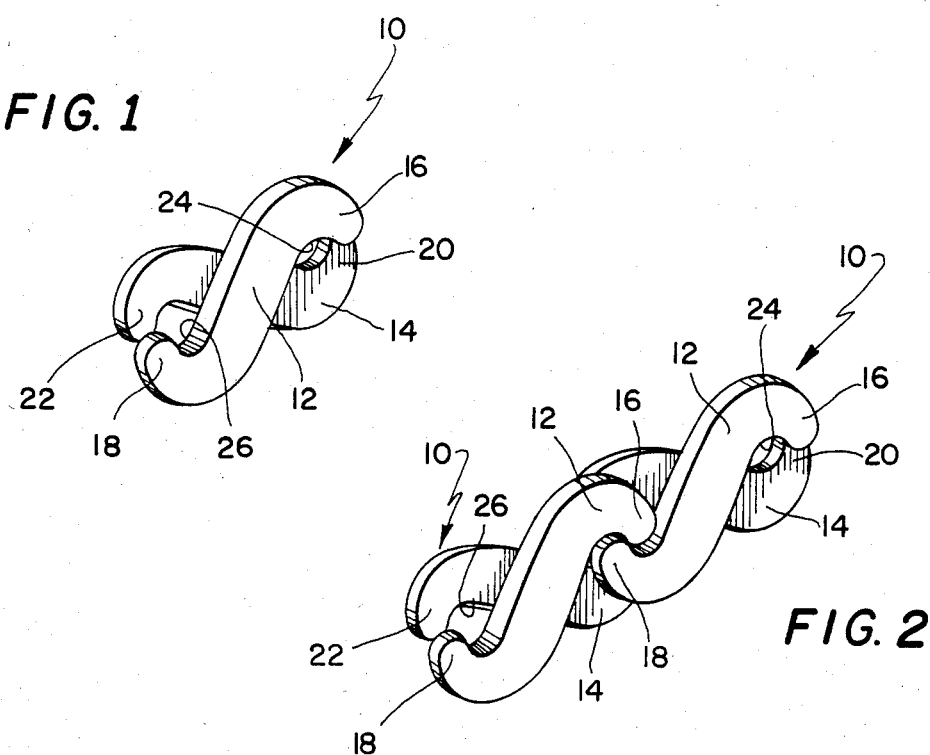
FIG. 1
FIG. 2
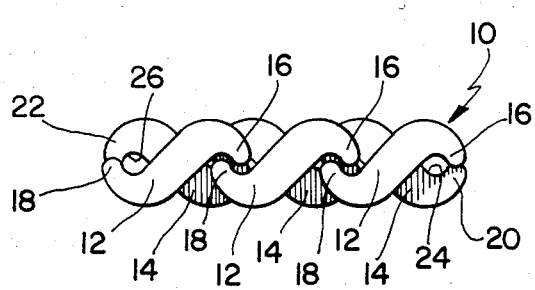
FIG. 3
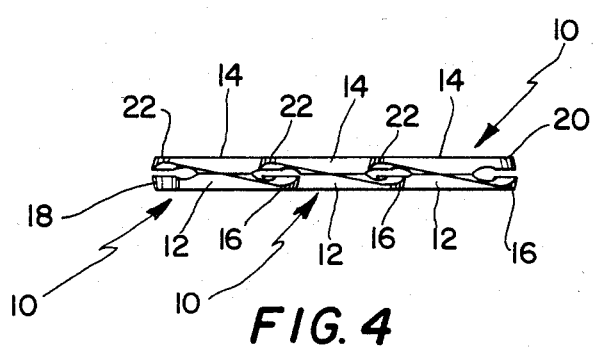
FIG. 4
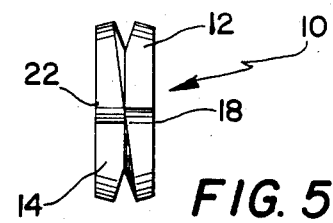
FIG. 5

DETACHABLY INTERCONNECTABLE CHAIN LINK AND CHAIN CONSTRUCTED THEREWITH

BACKGROUND AND SUMMARY OF THE INVENTION

The instant invention relates to chains and more particularly to a detachably interconnectable chain link and to a chain constructed therewith, which is particularly adapted for use in ornamental and jewelry applications.

A wide variety of chains comprising permanently interconnected links have been heretofore available for various applications, including jewelry and other ornamental applications. Further, various types of coupling links which are interconnectable with other links by manually manipulating them to closed or coupled positions have been heretofore available and various other types of interconnectable links and interlinkable members have also been heretofore available. The U.S. Pat. Nos. to FARMER, 725,235; HONABACH, 955,070; DONALDSON, 2,128,804 and WALLER, 2,740,253, disclose various types of devices which are exemplary of the known coupling links, whereas the U.S. Pat. Nos. to HANLY, 1,171,947; CHARLES, 2,714,269; SCHIGAS, 2,737,755 and NOBLE, 2,959,888, teach various other types of interconnectable links or interlinkable members. However, while the devices disclosed in these patents represent the closest prior art to the instant invention of which the applicant is aware, they are believed to be of only general interest with respect to the detachably interconnectable link of the instant invention and to the chain constructed therewith, as will hereinafter be made apparent.

The instant invention provides a novel and effective detachably interconnectable chain link which is particularly adapted for jewelry and other ornamental applications. The link of the instant invention comprises connected first and second link elements having free terminal ends, wherein the link elements cooperate to define a link having substantially closed loops at its opposite ends. At least one of the link elements is resiliently flexible, and the portions of the link elements adjacent the terminal ends thereof converge and terminate in closely adjacent laterally offset relation. Accordingly, the link of the instant invention is snap-receivable in interlinked relation with a second link of similar configuration by first positioning the two links in substantially end-to-end relation so that the terminal end of one link is closely adjacent to the terminal end of the other link. The two links are then urged together so that at least one of the pairs of terminal ends is resiliently separated by an amount sufficient to accept the other pair of terminal ends therebetween until the two links are received in interlooped or interlinked relation. In the preferred embodiment of the link of the instant invention, the link elements are of substantially S-shaped configuration and they each have first and second free terminal ends. The first and second link elements are connected to each other so that they cooperate to define first and second substantially closed loops at opposite extremities of the link, the portions of the link elements adjacent the first free ends thereof converging to form the first loop and terminating in closely adjacent laterally offset relation, and the portions of the link elements adjacent the second free ends thereof converging to form the second loop in the same manner. Hence, the preferred embodiment of the link of the instant invention, which is defined by two S-shaped link elements, is of substantially figure 8-shaped configuration, and the link elements are in different planes throughout their extents, and they are preferably integrally molded of a plastic material which is at least slightly resiliently flexible. A plurality of links of this type are accordingly detachably interconnectable to form a chain wherein adjacent loops of sequential links are interlooped or interlinked and because the link elements are laterally offset, i.e., are in different planes, the chain has a substantially flat configuration.

Accordingly, it is a primary object of the instant invention to provide an effective detachably interconnectable chain link.

Another object of the instant invention is to provide an effective detachably interconnectable chain link for jewelry and other ornamental chain applications.

A still further object of the instant invention is to provide a substantially flat ornamental chain comprising a plurality of detachably interconnected links of figure 8-shaped configuration.

Other objects, features and advantages of the invention shall become apparent as the description thereof proceeds when considered in connection with the accompanying illustrative drawings.

DESCRIPTION OF THE DRAWING

In the drawing which illustrates the best mode presently contemplated for carrying out the present invention:

FIG. 1 is a perspective view of the chain link of the instant invention;

FIG. 2 is a perspective view of a chain comprising a pair of the links in interconnected relation;

FIG. 3 is a side elevational view of a chain which comprises three of the links in interconnected relation;

FIG. 4 is a top plan view thereof; and

FIG. 5 is an end elevational view thereof.

DESCRIPTION OF THE INVENTION

Referring now to the drawing, the detachably interconnectable chain link of the instant invention is illustrated and generally indicated at 10 in FIGS. 1–5, a pair of the links 10 being illustrated in interconnected relation in FIG. 2 to define a short two-link section of chain, and three of the links 10 being illustrated in interconnected relation in FIGS. 3, 4 and 5 to define a three-link section of chain.

The link 10 comprises first and second link elements 12 and 14, respectively, which are of substantially S-shaped configuration. The link elements 12 and 14 are connected in face-to-face relation in substantially the central portions thereof so that they are laterally offset with respect to each other and so that they cooperate to define a substantially figure 8-shaped configuration of the link 10. The first link element 12 has opposite first and second terminal ends 16 and 18, respectively; whereas the second link element 14 has opposite first and second terminal ends 20 and 22, respectively. The portions of the first and second link elements 12 and 14 adjacent the first terminal ends 16 and 20 cooperate to define a first substantially closed loop 24 at one end of the link 10, wherein the first terminal ends 16 and 20 are located in closely adjacent laterally offset relation. In this connection, the first terminal ends 16 and 20 are substantially aligned in the same direction in which they are offset, and they are spaced in substantially the same direction by an amount which is less than the thickness of the adjacent end portions of either of the link elements 12 and 14, although they are resiliently separable in substantially the same direction for snap receiving a similar loop of another link in interconnected relation. Similarly, the portions of the link elements 12 and 14 adjacent the second terminal ends 18 and 22, respectively, cooperate to define a second substantially closed loop 26 at the opposite extremity of the link 10, wherein the second terminal ends 18 and 22 are in closely adjacent laterally offset relation. The second terminal ends 18 and 22 are also substantially aligned in the same direction in which they are offset, and they are spaced in substantially the same direction by an amount which is less than the thickness of the adjacent end portions of either of the link elements 12 and 14, although they also are resiliently separable in substantially the same direction for snap receiving a similar loop of another link in interconnected relation. The link 10 is preferably integrally molded of a suitable plastic material which is at least slightly resiliently flexible, such as a thermoplastic, for example, soft polyethylene, soft polyvinylchloride, polypropylene, or polycarbonate, or a duroplastic, for example, celluloid or fiberglass; although the use of other construction materials for the link 10 is contemplated, including metal. If desired, the link elements 12 and 14 could be separately, molded or formed, and then secured to each other by any suitable means.

The links 10 are simply and easily detachably interconnectable to form a multilink chain, wherein adjacent loops of adjacent links are interlooped or interlinked in the manner illustrated in FIGS. 2, 3 and 4. More specifically, by positioning a pair of the links 10 in end-to-end relation so that the first ends 16 and 20 of one of the links 10 are adjacent the second ends 18 and 22 of the second link 10, the two links 10 can be forcibly snapped into interlinked relation. This is done by pushing the two links 10 together so that the second ends 18 and 22 and/or the first ends 16 and 20, are separated by an amount sufficient to allow the adjacent portions of the other link 10 to be received therebetween so that the first loop 24 of one of the links 10 is interlooped or interlinked with the second loop 26 of the other link 10. As illustrated in FIGS. 2-4, when the two links 10 are interconnected in this manner, they cooperate to define a substantially flat-sided multi-linked section of chain. The chain is, however, flexible because of the interlinked relationship of the adjacent links 10 and because there is sufficient "play" or clearance between the interlinked ends, as illustrated most clearly at 16 and 18 in FIG. 3, to permit the chain to "drape" which is of particular importance when being used as a necklace or the like. Because the first terminal ends 16 and 20 are normally in closely adjacent relation and the second terminal ends 18 and 22 are also normally in closely adjacent relation, the adjacent links 10 of the chain remain interconnected during normal use. They are, however, disconnectable by pulling or twisting the adjacent links 10 relative to each other so that the first ends 16 and 20 and/or the second ends 18 and 22, are resiliently separated sufficiently to permit the adjacent links 10 to be disconnected.

It is seen therefore that the instant invention provides an effective detachably interconnectable link and a chain which comprises a plurality of detachably interconnectable links. In the preferred embodiment, the links 10 and the chain constructed therewith have attractive flat appearances, and links 10 can be easily added to or removed from the chain as desired to effect either the lengthening or the shortening thereof. The detachably interconnectable link and chain of the instant invention are effective for a variety of ornamental applications, including jewelry applications; and the unique way in which the links are snap-receivable in interlinked or interlooped relation makes them simple and easy to use. Hence, for these reasons it is seen that the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A detachably interconnectable chain link comprising a pair of substantially S-shaped link elements rigidly connected to each other at their central portions in crossing relation to define a link of substantially figure-8-shaped configuration having first and second substantially closed loops at opposite extremities thereof, said link elements each having first and second terminal end portions which are disposed in said first and second loops, respectively, and terminate in first and second terminal ends, respectively, said first terminal ends in said first loop being laterally offset with respect to each other, being substantially aligned in the same direction in which they are offset, and being spaced in substantially the same direction in which they are offset by an amount which is less than the thickness of either of said first terminal end portions but being resiliently separable in substantially the same direction in which they are offset for snap receiving a loop of similar configuration of another link therebetween, said second terminal ends in said second loop being laterally offset with respect to each other, being substantially aligned in the same direction in which they are offset, and being spaced in substantially the same direction in which they are offset by an amount which is less than the thickness of either of said second terminal end portions, but being resiliently separable in substantially the same direction in which they are offset for snap receiving a loop of similar configuration of another link therebetween.

2. In the link of claim 1, said first and second link elements being in laterally offset relation.

3. The link of claim 2, further characterized in that said link is of an integral, unitary plastic construction.

4. A chain comprising a combination of a plurality of the links of claim 1, connected in a series wherein adjacent loops of sequential links are interlinked.

5. In the chain of claim 4, said loops being dimensioned so as to permit the interlinked chain to drape.

* * * * *